(12) United States Patent
Benson et al.

(10) Patent No.: US 6,821,368 B2
(45) Date of Patent: Nov. 23, 2004

(54) CO-BONDED JOINT WITH Z-PINS

(75) Inventors: Ross A. Benson, Willow Park, TX (US); Patrick D. Sheahen, Fort Worth, TX (US); Larry R. Bersuch, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 194 days.

(21) Appl. No.: 09/973,208

(22) Filed: Oct. 9, 2001

(65) Prior Publication Data

US 2003/0066589 A1 Apr. 10, 2003

(51) Int. Cl.$^7$ .............................. B32B 7/08; B32B 5/22
(52) U.S. Cl. ...................................... 156/92; 156/307.1
(58) Field of Search ................................ 156/92, 307.1

(56) References Cited

U.S. PATENT DOCUMENTS

| | | | |
|---|---|---|---|
| 4,671,470 A | 6/1987 | Jonas | 244/199 |
| 4,729,860 A | * 3/1988 | Leach | 264/103 |
| 4,808,461 A | 2/1989 | Boyce et al. | 428/119 |
| 5,589,015 A | 12/1996 | Fusco et al. | 156/73.1 |
| 5,667,859 A | 9/1997 | Boyce et al. | 428/59 |
| 5,863,635 A | 1/1999 | Childress | 428/119 |
| 5,868,886 A | 2/1999 | Alston et al. | 156/98 |
| 5,879,492 A | * 3/1999 | Reis et al. | 156/72 |
| 5,919,413 A | 7/1999 | Avila | 264/249 |
| 5,935,680 A | * 8/1999 | Childress | 428/119 |
| 5,968,639 A | 10/1999 | Childress | 428/223 |
| 5,980,665 A | 11/1999 | Childress | 156/92 |

OTHER PUBLICATIONS

*Tension Pull–off and Shear Test Methods to Characterize 3–D Textile Reinforced Bonded Composite Tee–Joints*; Owens et al., published 2000 Composite Structures, Theory and Practice, Editors: Peter Grant and Carl Q. Rosseau.

*Primary Sandwich Structure, A Unitized Approach*; Sheahen et al.; copyright 2000 by Lockheed Martin; Published by the American Institute of Aeronautics and Astronauts, Inc.; pp. 1–8.

*Robust Composite Sandwich Structures*; Sheahen et al.; copyright 1998 by Lockheed Martin; Published by the American Institute of Aeronautics and Astronauts, Inc.; pp. 1–12.

*Affordable Composite Structure for Next Generation Fighters*; Bersuch et al.; copyright 1998 by Lockheed Martin; published by Society for the Advancement of Material and Process Engineering; pp. 1–11.

*Interlaminar Reinforced Composites Development for Improved Damage Tolerance*; Wanthal et al; copyright 200 by the Boeing Company, Lockheed Martin; Northrop Grunman; Society for the Advancement of Material and Process Engineering; 15 pages.

*3–D Composites in Primary Aircraft Structure Joints;*; Bersuch et al.; published Jan. 1997 AGARD Bolted/Bonded Joints in Polymeric Composites ; pp. 16–1–16–10.

*Affordable 3–D Integrated Composite Structures*; Sheahen et al.; copyright 2000 by Lockheed Martin; published by the Universal Technology Corporation; 20 pages.

* cited by examiner

*Primary Examiner*—Richard Crispino
*Assistant Examiner*—Barbara J Musser
(74) *Attorney, Agent, or Firm*—Bracewell & Patterson, L.L.P.

(57) ABSTRACT

A method is provided for using a woven preform having a base and at least one leg extending from the base. The preform is used to assemble first and second composite laminate components formed from tape or fabric and a resin matrix. Z-pins are inserted into the first component prior to its being cured, forming a stubble extending above a surface of the first component. The uncured preform is placed on the surface of the first component, the stubble extending into the preform. The cured second component is attached to the preform. Over-wrap plies are optionally placed on the outer surfaces of preform. Adhesive is optionally placed between the preform and the first and second components. A vacuum bag and tooling are used while curing the preform to adhere the legs of the preform to the second component and the base of the preform to the first component.

19 Claims, 2 Drawing Sheets

CO-BONDED JOINT WITH Z-PINS

BACKGROUND OF THE INVENTION

1. Field of the Invention

The present invention generally relates to assembly of components using woven preforms and particularly relates to assembly of components into structural joints using Z-pins and woven preforms.

2. Description of the Prior Art

Typical methods known in the art for attaching a composite skin to a composite frame web include forming the web as an "I" or "C" shape, making them more complex and expensive to fabricate. The flanged sections are fastened to adjacent sections using methods similar to those used with metal components, for example, by using fasteners. However, use of the fasteners adds weight to the joints.

These joints also have difficulty withstanding out-of-plane loading. Typical remedies for this are thick laminate stack-ups using many layers of composite fabric and having large flange radii. While this reduces the tension forces between the layers of the flanged section, the result is a heavy joint, reducing the weight savings realized when using composites.

Z-pins have been used to join two composite, laminate components in the prior art. For example, U.S. Pat. No. 5,968,639 to Childress discloses inserting Z-pins into a first composite component to form a stubble at a bonding face, then curing the first component. An uncured second component is then bonded to the first component with the stubble extending into and among the fibers of the second component and through the bond line.

Several techniques have been developed for inserting the Z-pins into composites laminates. Many techniques, like that described in U.S. Pat. No. 5,919,413 to Avila, are based on using a compressible foam carrier to retain the Z-pins before insertion. The pins are held in an orientation that is generally perpendicular to the surface in which they are to be inserted and are located near the surface. A piston is used to drive the pins into the surface, compressing the foam carrier as the pins are inserted. Typically, one or more nylon peel plies are placed on the surface of the laminate prior to insertion to ensure a clean bond surface and to protect the pins before assembly. The peel plies are removed prior to assembly.

SUMMARY OF THE INVENTION

A method is provided for using a woven preform having a base and at least one leg extending from the base. The preform is used to assemble first and second composite laminate components formed from tape or fabric and a resin matrix. Z-pins are inserted into the first component prior to its being cured, forming a stubble extending above a surface of the first component. The uncured preform is placed on the surface of the first component, the stubble extending into the preform. The cured second component is attached to the preform. Over-wrap plies are optionally placed on the outer surfaces of preform. Adhesive is optionally placed between the preform and the first and second components. A vacuum bag and tooling are used while curing the preform to adhere the legs of the preform to the second component and the base of the preform to the first component.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

Figure 3:
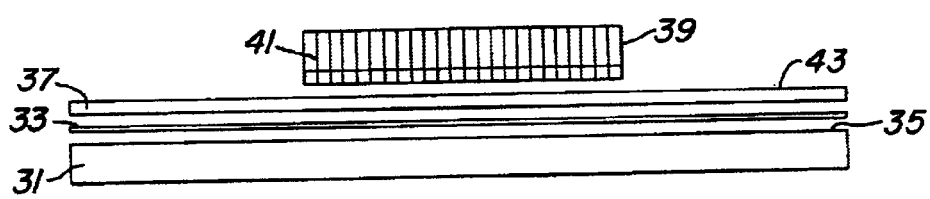
FIG. 3 is a front exploded view of a second embodiment of a method for inserting Z-pins into a first component prior to insertion of the Z-pins and in accordance with the present invention.
Figure 4:
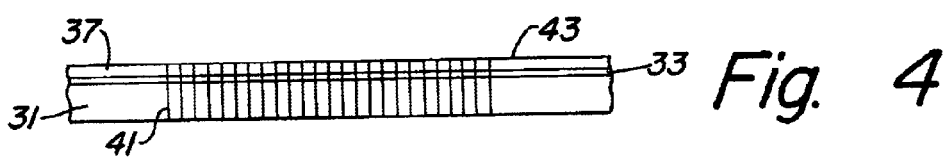
FIG. 4 is a front view of the component of FIG. 3 after insertion of the Z-pins and in accordance with the present invention.
Figure 5:
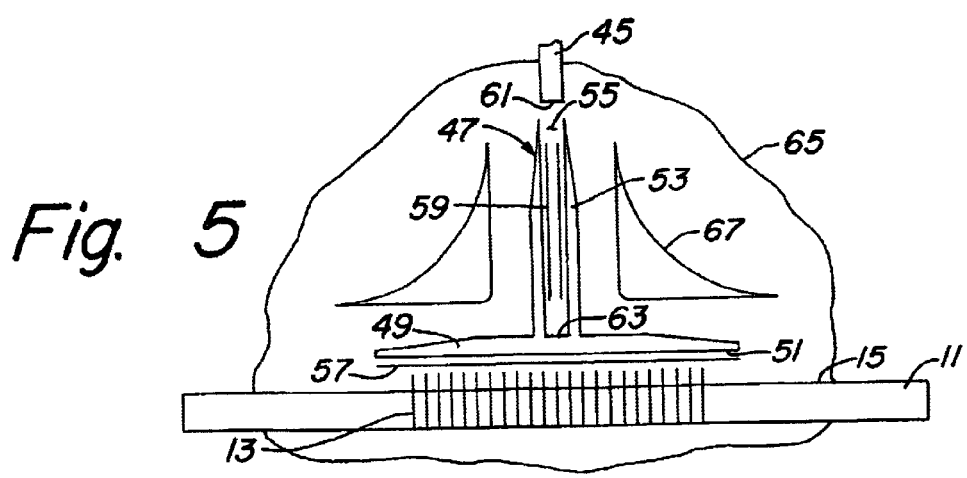
FIG. 5 is a front exploded view of a method of joining a first and second composite components and in accordance with the present invention.
Figure 6:
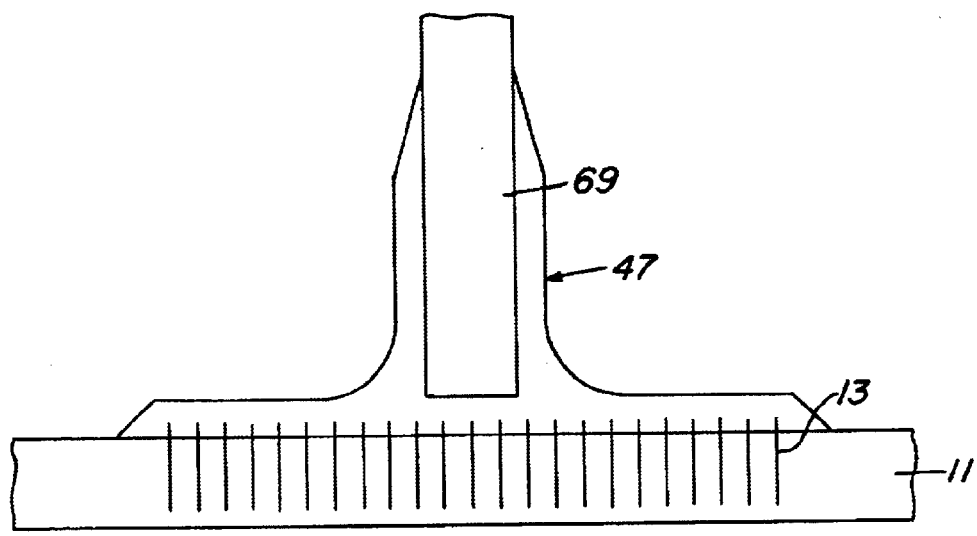
FIG. 6 is a front view of a method of providing an oversize clevis in a preform attached to a first component and in accordance with the present invention.

FIGS. 1 through 5 show a method for co-bonding two composite components using a woven preform and Z-pins. FIGS. 1 through 4 detail the installation of the Z-pins in one of the components. FIG. 5 details the assembly of the components using a preform.

Various resin systems are sold under the terms "laminating resins" and "adhesives," though there is no "bright-line," industry-standard definition by which to distinguish one from the other. The term "adhesive" is used herein to mean a resin system that has a lower modulus of elasticity and/or a higher strain-to-failure than the resin forming the matrix of the parts to be adhered. The combination of these characteristics is described as higher toughness, and adhesives have a higher toughness than laminating resins, which tend to be more brittle and have lower crack-formation loads.

Results from ASTM tests can be used to distinguish, generally, between laminating resins and adhesives. High-strength, structural laminating resins have a peel strength rating generally ranging from 0–15 pounds per linear inch, whereas the peel strength of adhesives is greater than 15 pounds per linear inch. For example, the Bell Peel test (ASTM D3 167 "Standard Test Method for Floating Roller Peel Resistance of Adhesives") shows that the peel strength of AF191, available from 3M of St. Paul, Minn., is 30–45 pounds per linear inch at room temperature, but the peel strength of 977-3, available from Cytec Industries, Inc. of West Paterson, N.J., which is used to laminate the components, is 0–6 pounds per linear inch. In addition, laminating resins generally have a tensile strength greater than 7500 pounds per square inch (psi) as tested using ASTM D638 ("Standard Test Method for Tensile Properties of Plastics"), with high-strength resins ranging to 10000 psi. Adhesives generally have tensile strengths lees than 6500 psi. Thus, in the present application, "adhesives" also means resin systems with tensile strengths less than 6500 psi and a peel strength greater than 15 pounds per linear inch. "Laminating resins" is used to mean resin systems having tensile strengths greater than 7500 psi and a peel strength of less than 15 pounds per linear inch. Thus, when adhering two resin-infused components, an adhesive may be used between the components to provide for a high bond strength.

Figure 1:
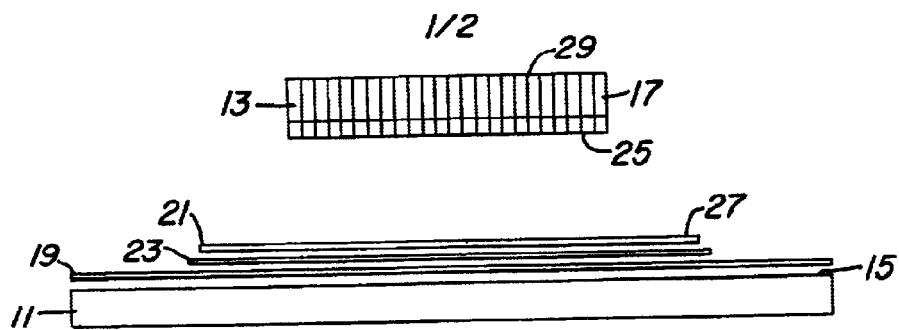
FIG. 1 is a front exploded view of a method for inserting Z-pins into a first component prior to insertion of Z-pins and in accordance with the present invention.

FIG. 1 shows a "green" composite panel 11 comprising a plurality of layers of uni-directional tape or woven fabric and an uncured resin matrix. The resin may be any of several available laminating resins, for example, 977-3. Panel 11 is a flat plane, but panel 11 may be curved. In order to provide for a stronger joint when adhering a second composite component to panel 11, Z-pins 13 are inserted into an upper, bonding surface 15 of panel 11. Pins 13 are preferably formed from graphite or titanium and are initially held within a foam carrier 17. Pins 13 are preferably inserted as normal to surface 15, pins 13 being vertically oriented and arranged in a matrix that provides for the desired areal density and pin locations after insertion of pins 13.

Before insertion of pins 13, at least one peel ply 19 is placed against bonding surface 15. Peel ply 19 is infused with resin prior to application to avoid bleeding out resin from the layers of panel 11 during curing of panel 11. This first peel ply 19 ensures that bonding surface 15 remains clean until panel 11 is to be adhered to another component. Bonding surface 15 is required to be free of contaminants prior to application of adhesive, and peel ply 19 is removed just prior to use. Typically, a second, resin-infused peel ply 21 is placed over peel ply 19 to produce a desired thickness above bonding surface 15, though additional peel plies 21 can be added to increase the thickness. This thickness determines the height of the upper ends of inserted pins 13 above bonding surface 15 and prevents over-insertion of pins 13. Peel plies 19, 21 are woven fabrics and are preferably formed from glass or nylon fibers, though Kevlar fibers may also be used. A non-porous, Teflon-coated film 23, such as TX 1040, available from Pall Corporation, of East Hills, N.Y., may be used between peel plies 19, 21 to provide for easier removal of peel ply 21 after insertion of pins 13 and curing of panel 11.

After application of peel plies 19, 21 and before insertion of pins 13, the entire stack of layers, comprising panel 11, plies 19, 21, and film 23, go through hot debulking. Hot debulking is a process in which the stack is brought up to a temperature that will allow the resin to flow and wet all of the fibers in panel 11, but the temperature and the time at that temperature are below those needed for curing of the resin. Though not shown, additional peel plies maybe placed over peel ply 21 to produce a greater thickness above bonding surface 15. Film 23 may optionally be used between additional peel plies.

To insert pins 13 after the hot-debulking step, carrier 17 is located laterally on peel ply 21 to position pins 13 over the desired insertion locations. A lower surface 25 of carrier 17 containing pins 13 is placed against an upper surface 27 of peel ply 21. Pins 13 are inserted by using an ultra-sonic vibrating head (not shown) to drive them from carrier 17, through peel plies 19, 21 and film 23, and through bonding surface 15 into panel 11. The vibrating head is placed against an upper surface 29 of carrier and driven downward while vibrating. Carrier is made from a foam and collapses between the head and peel ply 21 as the head moves downward. Because pins 13 are rigid, the vibrating head forces pins 13 downward once the upper ends of pins 13 come in contact with the lower surface of the head. Pins pass out of carrier 17 and through peel plies 19, 21 and film 23. The lower ends of pins 13 enter panel 11 at bonding surface 15 and travel through a portion of the thickness of panel 11. Pins 13 are pushed into panel 11, preferably until the vibrating head is near upper surface 27 of peel ply 21.

Figure 2:
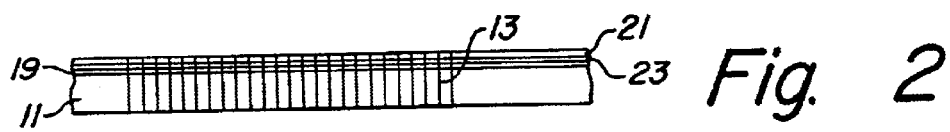
FIG. 2 is a front view of the component of FIG. 1 after insertion of the Z-pins and in accordance with the present invention.

The head is withdrawn, and carrier 17 is removed, leaving a small portion of the upper ends of pins 13 remaining above upper surface 27 of peel ply 21. If pins 13 are made from graphite, the exposed ends of pins 13 are sheared off to leave the upper ends of pins 13 flush with upper surface 27, as shown in FIG. 2. If pins 13 are titanium, the vibrating head is used to drive them downward until pins 13 are flush with upper surface 27. Peel plies 21 can be removed prior to shearing or further insertion of pins 13 to adjust the thickness of the stack of peel plies 19, 21 and the resulting height of pins 13, though this is typically done after adding additional peel plies 21. With pins 13 made from graphite, peel plies may be removed and the ends of pins 13 maybe sheared off after panel 11 is cured.

Once pins are at the desired height, panel 11 is fully cured, securing pins 13 in panel 11. Peel plies 19, 21 have the advantage of transferring autoclave pressures around the pins during curing, which produces a well-consolidated, distortion-free laminate panel 11. Peel plies 19, 21 remain on panel 11 and protect pins 13 during curing, storage, and handling of panel 11 until peel plies 19, 21 are removed prior to assembly to expose stubble and bonding surface 15.

Experimentation has shown that a height of 0.030 in. of the upper ends of pins 13 over bonding surface 15 allows for less difficult removal of peel plies 19, 21 and for uncured composites components to more easily "bed down," meaning they can position properly so that pins 13 enter the weave of the second component during assembly. In a situation where the component does not bed down, a resin-rich bond joint exists, weakening the assembled structure. Also, with larger heights, there is greater difficulty in pulling off peel plies 19, 21 and in causing pins 13 to properly enter the second component. However, use of larger heights, including 0.050 in. and 0.070 in. have been successfully demonstrated.

The preferred method uses two peel plies 19, 21, each having a thickness of approximately 0.010 in., plus film 23 to provide for the proper height of inserted pins 13. Graphite can be used when creating pin stubble with a height up to 0.060 in., but exceeding this height may result in damage to the stubble when removing peel plies 19, 21. For taller stubble, titanium pins should be used. The areal density of Z-pins 13 having a diameter of 0.020 in. should be kept to 2% or less to provide for easier removal of peel plies 19, 21. Titanium pins also have the capability of having a bevel formed on the ends, providing easy penetration into uncured components.

An alternate way of ensuring the desired height of inserted pins is illustrated in FIGS. 3 and 4, this method preferably being used to create taller stubble. An uncured composite panel 31 is overlaid by a nylon peel ply 33, though peel ply 33 can be formed of other materials, as described above. Rather than using several additional peel plies to produce a thickness above bonding surface 35, an elastomeric spacer 37 is placed against peel ply 33. After hot debulking of panel 31, peel ply 33, and spacer 37, carrier 39 containing Z-pins 41 is placed against upper surface 43 of spacer 37 to position pins 41 for insertion. Pins 41 are driven through spacer 37 and peel ply 33 and into panel 31, as described above. After insertion, panel 31 is cured. Spacer 37 protects pins 41 during curing, storage, and handling of panel 31 and is removed, along with peel ply 33, prior to assembly.

FIG. 5 shows the assembly of a second, cured, composite component 45 to cured panel 11 using an uncured, woven, Pi-shaped preform 47. Panel 11 contains pins 13, which can be inserted using the methods shown in FIGS. 1 and 2 or in FIGS. 3 and 4. Preform 47 comprises a base 49 having a continuous lower surface 51 and two upstanding legs 53 that form a clevis 55, or slot, between them. An adhesive film 57, for example, AF191, is placed between lower surface 51 of preform 47 and bonding surface 15 of panel 11 for adhering preform 47 to panel 11. Preform 47 beds down onto pins 13, which enter the weave of base 49 of preform 47. Adhesive film 59 is also placed against the inner surface of legs 53 in clevis 55 for adhering legs 53 to component 45. Component 45 is then inserted into clevis 55 until lower surface 61 of component 45 contacts upward-facing surface 63 of preform 47. The assembly is enclosed within a vacuum bag 65 together with silicone-rubber tooling 67 used to evenly distribute pressure along the outer surfaces of preform 47. This even distribution ensures that preform 47 is pressed against surface 15 of panel 11 and that legs 53 are pressed against component 45 when a vacuum is applied to bag 59.

An alternative method of assembly involves inserting an oversize tool 69 within the clevis 55 of preform 47 and curing preform 47 with tool 69 in place of component 45 (FIG. 5), tool 69 having a width that is larger than component 45. During curing, clevis 55 takes the size and shape of tool 69. After curing, tool 69 is removed, and a paste adhesive (not shown) is injected into clevis 55. Component 45 is then inserted into oversized clevis 55 and is adhered to the preform 47 by the paste adhesive.

Figure 7:
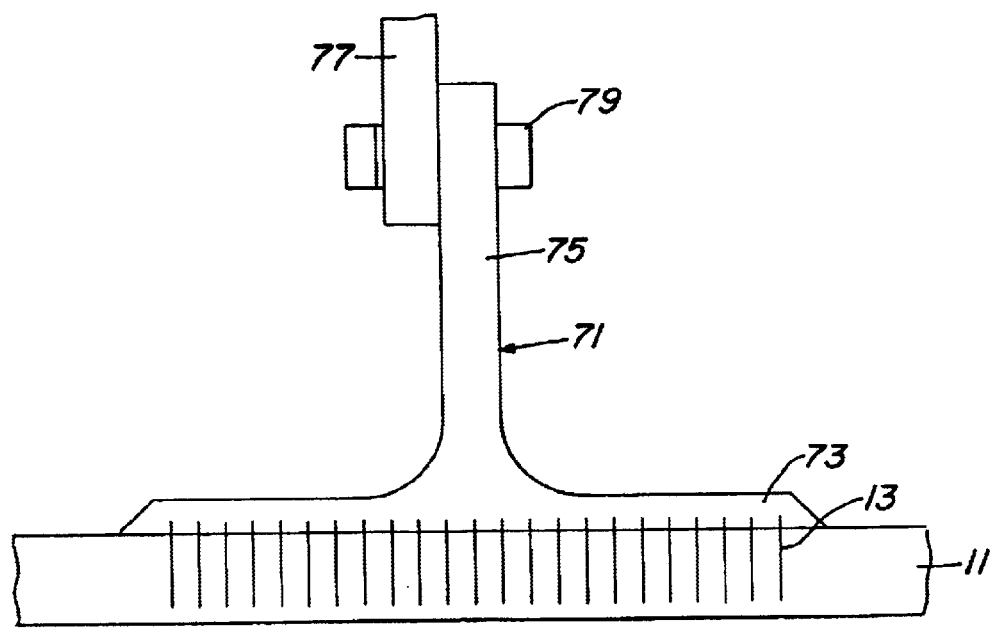
FIG. 7 is a front view of an alternative embodiment of a component constructed in accordance with this invention.

Preform 47 may also be of other shapes. FIG. 7 shows a T-shaped preform 71 has a base 73 and a single, generally-vertical leg 75 that extends from base 73. As described above, pins 13 extend through base 73 and panel 11 for strengthening the bond between preform 71 and panel 11. A composite component 77 is attached to leg 75 using fastener 79, though component 77 may also be attached by other means, such as by bonding. Preform 71 may also be used as a stiffener, rather than as a connector, by being bonded to a panel requiring stiffening and leg 75

The present invention provides for several advantages. The method of insertion of Z-pins uses peel plies to provide for control of the length of the portion of the pins that protrudes from the upper surface of the panel after the pins are driven into the panel. Also, the peel plies keep the bonding surface clean and protect the pins during storage and handling before the panel is needed for assembly. The pins are inserted into the base portion of a Pi-shaped, woven preform, providing for a joint that is stronger than without the pins.

While the invention has been shown in only some of its forms, it is not thus limited but is susceptible to various changes and modifications without departing from the spirit thereof.

What is claimed is:

1. A method of making a composite structure, the method comprising:
   (a) locating at least two peel two peel plies on the bonding surface of a component, with a first one of the peel plies being of a woven material and being in contact with the bonding surface; then
   (b) inserting pins through the peel plies and into the component prior to curing of the component; then
   (c) curling the component;
   (d) providing a woven preform having a base and two legs extending from the base, the legs defining a slot; then
   (e) removing the peel plies to expose a stubble created by the pins and placing the base of the preform against the bonding surface of the component, the pins extending into the base of the preform;
   (f) curing the preform to adhere the base of the preform to the component;
      wherein step (b) comprises placing a foam carrier containing the pins against the peel plies and exerting a downward force on the foam carrier, then removing the foam carrier before curing the component in step, (c); and wherein the method further comprises
      leveling the pins to cause ends of the pins to be flush with an exterior surface of the peel plies after removal of the foam carrier.

2. The method of claim 1, further comprising:
   inserting a second component into the slot of the preform after step (e) and before step (f); and
   completing step (f) with the second component in the slot.

3. The method of claim 1, further comprising:
   inserting a rigid sizing tool into the slot of the preform after step (e) and before step (f);
   completing step (f) with the sizing tool in the slot;
   removing the sizing tool after step (f), the slot being sized for insertion of a second component; and
   inserting the second component into the slot and adhering the second component to the preform.

4. A method of joining first and second composite components the method comprising:
   (a) placing a stack of layers onto a bonding surface of the first component, a first layer of the stack of layers being in contact with the bonding surface and being a woven peel ply layer;
   (b) providing a plurality of Z-pins in a foam carrier and inserting the Z-pins through the stack of layers into the first component prior to coring the first component by placing the foam carrier in contact with the stack of layers and exerting a force on the foam carrier;
   (c) curing the first component;
   (d) leveling the Z-pins to cause ends of the Z-pins to be flush with an exterior surface of the stack of layers with the foam carrier removed;
   (e) providing a woven preform having a base and at least one leg extending front the base;
   (f) removing the stack of layers after the first component has been cured, creating a stubble of Z-pins above the bonding surface, then placing the base of the preform against the bonding surface of the first component, the stubble extending into the base of the preform;
   (g) placing the second component in contact with the leg of the preform; and
   (h) curing the preform to adhere the base of the preform to the first component and the leg of the preform to the second component, joining the components with the preform.

5. The method of claim 4, further comprising:
   in step (f), inserting adhesive between the base of the preform and tire first component.

6. The method of claim 4, further comprising:
   in step (g), inserting adhesive between the leg of the preform and the second component.

7. The method of claim 4, further comprising:
   removing the foam carrier before curing the panel in step (c).

8. The method of claim 4, wherein step (d) comprises:
   after curing the panel in step (c) removing at least one of the layers and trimming the stubble to a height equal to a height of the layers that remain on the bonding surface.

9. The method of claim 4, wherein step (d) comprises:
before curing the panel in step (c), removing at least one of the layers to expose ends of the Z-pins and exerting an additional force on the ends of the Z-pins until the ends are flush with the exterior surface of the remaining layers.

10. The method of claim 4, wherein:
the peel ply is formed from nylon fibers.

11. The method of claim 4, wherein:
the peel ply is formed from glass fibers.

12. The method of claim 4, wherein the stack of layers comprises:
an elastomeric spacer located above the first layer.

13. A method of joining a woven preform to a panel the method comprising:
   (a) placing at least one woven peel ply layer in contact with a bonding surface of a composite panel;
   (b) providing a plurality of Z-pins within a foam carrier and inserting Z-pins into the peel ply layer and the composite panel prior to curing the panel by placing the foam carrier on the peel ply layer and exerting a downward force on the foam carrier, then removing the foam carrier; then
   (c) curing the panel; then
   (d) after the panel is fully cured, removing the peel ply layer to expose the bonding surface and form a stubble of Z-pins protruding from the bonding surface;
   (e) providing a woven preform having a base and at least one leg that extends from the base, the preform being infused with uncured resin; then
   (f) placing the base of the preform against the bonding surface of the panel after the peel ply layer has been removed, the stubble extending into the base of the preform; then
   (g) curing the preform with the at least one leg in a desired orientation; and after application of the peel ply and before insertion of the Z-pins, heating the panel and the peel ply to hot debulk the panel and the peel ply.

14. The method of claim 13, wherein
step (a) further comprises locating an elastomeric spacer on the peel ply and removing the spacer along with the peel ply before step (f).

15. A method of joining a woven preform to a panel, the method comprising:
   (a) placing at least one woven peel ply layer in contact with a bonding surface of a composite panel;
   (b) providing a plurality of Z-pins within a foam carrier and inserting Z-pins into the peel ply layer and the composite panel prior to curing the panel by placing the foam carrier on the peel ply layer and exerting a downward force on the foam carrier, then removing the foam carrier; then
   (c) curing the panel; then
   (d) after the panel is fully cured, removing the peel ply layer to expose the bonding surface and form a stubble of Z-pins protruding from the bonding surface;
   (e) providing a woven preform having a base and at least one leg that extends from the base, the preform being infused with uncured resin; then
   (f) placing the base of the preform against the bonding surface of the panel after the peel ply layer has been removed, the stubble extending into the base of the preform; then
   (g) curing the preform with the at least one leg in a desired orientation; and
   shearing ends of the Z-pins flush with an exterior surface of the peel ply layer before step (f).

16. A method of joining a woven preform to a panel, the method comprising:
   (a) placing at least one woven peel ply layer in contact with a bonding surface of a composite panel;
   (b) providing a plurality of Z-pins within a foam carrier and inserting Z-pins into the peel ply layer and the composite panel prior to curing the panel by placing the foam carrier on the peel ply layer and exerting a downward force on the foam carrier, then removing the foam carrier; then
   (c) curing the panel; then
   (d) after the panel is fully cured, removing the peel ply layer to expose the bonding surface and form a stubble of Z-pins protruding from the bonding surface;
   (e) providing a woven preform having a base and at least one leg that extends from the base, the preform being infused with uncured resin; then
   (f) placing the base of the preform against the bonding surface of the panel after the peel ply layer has been removed, the stubble extending into the base of the preform; then
   (g) curing the preform with the at least one leg in a desired orientation; and wherein
   step (a) comprises placing at least two of the woven-fabric peel plies on the bonding surface of the panel with a non-porous film between them and removing both of the peel plies and the non-porous film before step (f).

17. A method of joining a woven preform to a panel, the method comprising:
   (a) placing at least one woven peel ply layer in contact with a bonding surface of a composite panel:
   (b) providing a plurality of Z-pins within a foam carrier and inserting Z-pins into the peel ply layer and the composite panel prior to curing the panel by placing the foam carrier on the peel ply layer and exerting a downward force on the foam carrier, then removing the foam carrier; then
   (c) curing the panel; then
   (d) after the panel is fully cured, removing the peel ply layer to expose the bonding surface and form a stubble of Z-pins protruding from the bonding surface;
   (e) providing a woven preform having a base and at least one leg that extends from the base, the preform being infused with uncured resin; then
   (f) placing the base of the preform against the bonding surface of the panel after the peel ply layer has been removed, the stubble extending into the base of the preform; then
   (g) curing the preform with the at least one leg in a desired orientation; and
   in step (a) placing additional layers on the woven peel ply before inserting the Z-pins; and
   after insertion of the Z-pins, removing at least one of the additional layers along with the foam carrier, and leveling the Z-pins to cause ends of the Z-pins to be flush with the remaining layers on the bonding surface of the panel.

18. The method according to claim 17, wherein the Z-pins are leveled by shearing the ends of the Z-pins after the panel is cured in step (c).

19. A method of making a composite structure, the method comprising:
  (a) locating at least two peel plies on the bonding surface of a component, with a first one of the peel plies being of a woven material and being in contact with the bonding surface; then
  (b) inserting pins trough the peel plies and into the component prior to curing of the component; then
  (c) curing the component;
  (d) providing a woven preform having a base and two legs extending from the base, the legs defining a slot; then
  (e) removing the peel plies to expose a stubble created by the pins and placing the base of tire preform against the bonding surface of the component, the pins extending into the base of the preform;
  (f) curing the preform to adhere the base of the preform to the component;
    wherein step (b) comprises placing a foam carrier containing the pins against the peel plies and exerting a downward force on the foam carrier, then removing the foam carrier before curing the component in step (c); and wherein the method further comprises
  after removal of the foam carrier and after curing the component in step (c), removing at least one of the peel plies and shearing protruding ends of the pins to be flush with an exterior surface of a remaining one of the peel plies.

* * * * *